United States Patent Office 3,792,152
Patented Feb. 12, 1974

3,792,152
STABILIZED PHOSPHATE AND DENTIFRICE COMPOSITIONS AND PROCESS FOR PRODUCING SAME
Keun Y. Kim, Chesterfield, Mo., assignor to Monsanto Company, St. Louis, Mo.
No Drawing. Filed Nov. 12, 1971, Ser. No. 198,441
Int. Cl. C01b 15/16, 25/26
U.S. Cl. 423—311                               6 Claims

ABSTRACT OF THE DISCLOSURE

Phosphate salts of metal of Group II of the Periodic Table, especially alkaline-earth metal salts such as dicalcium phosphate, are stabilized against hydrolysis by the incorporation therein of a phosphonic acid of the general formula:

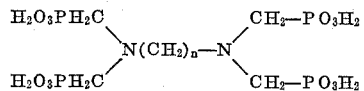

wherein $n$ is from 1 to 10 or a water soluble salt thereof.

---

The present invention relates to the stabilization of phosphate salts of Group II metal salts and to compositions containing such salts, particularly dentifrice compositions.

Dentifrice compositions, for example toothpastes or tooth powders, contain, inter alia, dicalcium phosphate which acts as a polishing agent. Both dihydrate and anhydrous forms are employed. In many cases the compositions also contain other ingredients which cause the calcium phosphate present therein to hydrolyze, yielding acidic products. These acidic products in time cause the compositions to solidify, thus rendering them unfit for use, this problem being aggravated in tropical climates where the compositions are subjected to high ambient temperatures. Furthermore, the acidic products also react with any carbonate material present in the composition to yield carbon dioxide which may generate sufficient pressure within the dentifrice container to cause it to bulge. Additionally, these acidic products cause tube corrosion problems, particularly in dentifrice preparations where anhydrous dicalcium phosphate is used exclusively or in a large proportion as the polishing agent. The aluminum tube is attacked by the acidic component generated as the result of hydrolysis to cause tube darkening. In severe cases, the tube is pitted and/or the gas generated exerts so much pressure that the tube finally breaks at the end. This type of corrosion problem is encountered even in dentifrices containing a mixture of stabilized dicalcium phosphate dihydrate and anhydrous dicalcium phosphate. Anhydrous dicalcium phosphate in commerce is not usually stabilized.

It has therefore been customary to stabilize the calcium phosphate present in dentifrice compositions and thereby prevent its hydrolysis. This stabilization has usually been achieved by the addition of such materials as pyrophosphoric acid, sodium pyrophosphate or sodium calcium pyrophosphate to a slurry of dicalcium phosphate in water. The slurry has then been filtered and the calcium phosphate incorporated into the dentifrice composition. It has also been proposed to dry mix calcium phosphate with trimagnesium orthophosphate. Although each of these methods usually effect satisfactory stabilization of the calcium phosphate, each suffers from some disadvantage in that: where pyrophosphoric acid is used the stabilization is not constant since it is difficult to obtain an acid of consistent strength and because it is difficult to handle the acid; where salts of pyrophosphoric acid are used, it is necessary to treat the dicalcium phosphate under rigorous conditions of time, temperature and concentration to ensure adequate and consistent stabilization; and where magnesium phosphates are used, the dry mixing technique is inconvenient. It has now been found that if, in place of part or all of the commonly used stabilizing agents, there are used certain phosphonic acids or salts thereof, effective and uniform stabilization of the phosphate material in the dentifrice composition may be achieved and corrosion of aluminum tubes decreased.

Although the present invention is of especial application in the stabilization of dentifrice formulations containing alkaline earth metal phosphate salts, the discovery upon which it is based is not limited to such applications, but also enables phosphate salts of Group II metals, such as magnesium, strontium, barium or zinc, destined for a variety of uses to be stored for prolonged periods prior to use.

Accordingly, the present invention provides a process for the stabilization of phosphate salts of the metals of Group II of the Periodic Table against hydrolysis which comprises adding thereto a polyamine polyphosphonic acid of the general formula:

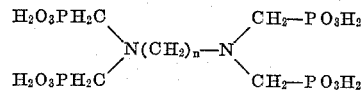

wherein $n$ is a number from 1 to 10 or a water soluble salt thereof.

Operable polyamine polyphosphonic acid or salts thereof include methylene diamine tetra(methylene phosphonic acid), ethylene-diamine tetra(methylene phosphonic acid), penta methylene diamine tetra(methylene phosphonic acid), hexamethylene diamine tetra(methylene phosphonic acid), octamethylene diamine tetra(methylene phosphonic acid) and the water soluble pharmaceutically acceptable salts of these acids, e.g., the alkali metal salts such as sodium and potassium or the ammonium salts.

Mixtures of any of the foregoing polyamine polyphosphonates can be used in the practice of this invention.

The polyamine polyphosphonic acids and suitable salts thereof can be prepared in any convenient manner. For example, according to the teachings of U.S. 3,288,846, which is incorporated herein by reference.

The phosphate salts to which the invention is applicable are those of the metals of Group II of the Periodic Table. The invention is of especial use in the stabilization of the alkaline-earth metal salts, notably the calcium phosphate salts. The term phosphate salt is used herein to denote the salts of orthophosphoric acid.

The amount of the polyamine phosphonic acid or salt thereof of the present invention which is to be added to a composition containing the phosphate salts will depend upon the extent of stabilization required, the phosphate salt content and the amount, if any, of other stabilizing agents which may be present. The amount required to secure stabilization is also dependent upon the conditions under which the composition is to be stored or used and may be affected by other ingredients in the composition. The precise stabilizing amount required may be readily ascertained by simple trial and error. However, it has been found that, in general, the use of from 0.1 to 5%, preferably from 0.5 to 1% by weight of such polyamine phosphonic acid or salts thereof, based on the amount of phosphate salt present is satisfactory if no other stabilizer is present. The stabilizers of the present invention may be incorporated into the compositions at any time during their preparation. However, in order to achieve satisfactory stabilization with the minimum amount of stabilizer it is preferred to add the stabilizer of the invention to the slurry of the phosphate salt in the manner used with the prior art stabilization of dicalcium phosphate.

As indicated above, the polyamine phosphonic acids and salts of the invention may be used in conjunction with the stabilizers used hitherto. Where mixtures of stabilizers are employed, the amount of phosphonic acid present therein is preferably not less than 30% by weight of the mixture. The total amount of mixture employed will vary with the nature of the conventional stabilizer used. However, a sufficient amount of the mixture to provide from 0.1% to 5% by weight, based on the phosphate salt of the phosphonic acid, is usually required.

Dentifrice compositions are desirably substantially neutral, i.e., they have a pH value of about 7, and it is therefore desirable to use salts of the phosphonic acids as stabilizers. However, in some cases it may be desired to use the free phosphonic acids and to adjust the pH of the treated slurry of phosphate salt by the addition of lime or magnesium oxide thereto. Since it is possible to achieve stabilization with only very small amounts of phosphonic acids of the invention, the adjustment of the pH is usually not necessary, for the addition of the stabilizer to the phosphate salt does not alter the pH of the slurry to any appreciable extent.

The dentifrice compositions may contain, in addition to the stabilizers and phosphate salts specified above, conventional ingredients such as flavors, emulsifiers, fillers and bacteriostat. Since mixtures of acid stabilizers may be used, as indicated above, the phosphonic stabilizers of the invention may be added at any point in the preparation of the dentifrice composition.

Although the invention is directed mainly to the stabilization of dentifrice formulations, which usually contain dicalcium phosphate, the stabilization of other compositions containing phosphate salts which are to be stored for prolonged periods prior to use, or are destined for other uses may be achieved in substantially the same manner. In such cases there may be no reason for ensuring that the compositions are substantially neutral. The phosphate salts contained in such other compositions need not be calcium salts, but may be, for example, barium, strontium, or zinc or magnesium salts.

The invention will now be illustrated in the following examples in which all parts and percentages are given by weight.

EXAMPLE I 1.5 l. of orthophosphoric acid having a 31% by weight concentration is added in a suitable vessel equipped with an agitator. The temperature is maintained at 80° C. About 2.4 l. of a lime slurry having 12% as CaO by weight concentration is gradually added until the pH reached 7.0-7.5. The reaction mixture is cooled to room temperature and the slurry filtered and dried. At this point, to a 10 gm. sample (A), ethylene diamine tetra(methylene phosphonic acid) sodium salt solution having a pH of 7.5 is added to provide 0.1% by weight, based on the weight of the dicalcium phosphate anhydrous.

In order to test the pH stability, a 10% aqueous slurry of sample A is boiled for two hours. A pH drop not below 6.5 is considered satisfactory. The same determination is made on a control, on sample (B) containing 0.5% of ethylene diamine tetra(methylene phosphonic acid), on sample (C) containing 3% of ethylene diamine tetra(methylene phosphonic acid) and on samples D, E, and F, the same amounts of hexamethylene diamine tetra(methylene phosphonic acid) in place of ethylene diamine tetra(methylene phosphonic acid). The results are shown in Table I below.

TABLE I

| Sample: | pH before | pH after |
|---|---|---|
| A | 7.5 | 7.0 |
| B | 7.5 | 7.0 |
| C | 7.6 | 7.3 |
| D | 7.8 | 7.0 |
| E | 7.9 | 7.3 |
| F | 7.4 | 7.2 |
| Control | 7.5 | 5.0 |

EXAMPLE II

In order to test anticorrosion effect, an unlined aluminum tube coupon was immersed in a 1:1 mixture of 45% glycerine and dicalcium phosphate anhydrous containing 0.4% of ethylene diamine tetra(methylene phosphonic acid) prepared in the same manner as Example I, maintained at 50° C. for one month. The same test is run on a control.

The control sample produced a considerably darkened surface with pitted holes. The sample containing the material of the present invention preserved the original surface, unmarred.

EXAMPLE III

A known amount of 1.75 S.G. orthophosphoric acid is diluted with water to a specific gravity of about 1.2 gm./cc. A slurry of milk of lime containing about 18% w./w. $Ca(OH)_2$ is added with rapid stirring to the acid at such a rate as to maintain the temperature at 40±5° C. The reaction is continued until the pH value of the slurry was about 7.0. At this point 1% w./w., based on the weight of the dicalcium phosphate dihydrate, of ethylene diamine tetra(methylene phosphonic acid) is added to the slurry. The pH of the slurry is readjusted to about 7 by adding more milk of lime and the dicalcium phosphate dihydrate is separated by filtration, dried and milled.

EXAMPLE IV

Dicalcium phosphate dihydrate is prepared under conditions described in Example III except that the lime slurry is added until the pH reached approximately 7.2. At this point, 2% w./w., based on the weight of dicalcium phosphate dihydrate, of hexamethylene diamine tetra(methylene phosphonic acid) is added and the slurry was allowed to equilibrate for fifteen minutes. The dicalcium phosphate dihydrate is removed by filtration, dried and milled.

EXAMPLE V

Dicalcium phosphate dihydrate is prepared by adding milk of lime slurry to phosphoric acid as in Example III. When the pH of the slurry is 7, the dicalcium phosphate dihydrate is separated by filtration, dried and milled. 5% w./w. of the disodium salt of hexamethylene diamine tetra(methylene phosphonic acid) is added to the dicalcium phosphate dihydrate. The two salts were mechanically mixed and milled to a size suitable for dentifrice compositions.

EXAMPLE VI

Examples III, IV and V are repeated using methylene diamine tetra(methylene phosphonic acid) in place of the respective phosphoric acid advocated. The amounts used were 1%, 2% and 5% (as the monosodium salt) respectively.

EXAMPLE VII

The dicalcium phosphate dihydrates prepared in Examples III, IV and V are tested for their stability, using TGA[1] method No. 46. The pastes dicalcium phosphate dihydrate and 80% glycerine in the test exhibited no change in consistency or became slightly thinner than that of the original paste after the boiling-water treatment. No lump formation is observed. Similar treatment of a control, or unstabilized dicalcium phosphate dihydrate produced a solidified mass.

[1] Toilet Goods Association Standard.

What is claimed is:
1. A process for stabilizing a phosphate salt of Group II metals comprising admixing therewith from about 0.5 to 1% by weight, based on the phosphate salt, of a polyamide polyphosphonic acid of the formula:

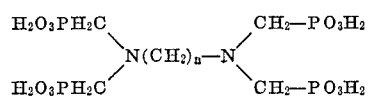

wherein n is a number from 1 to 10 or a water soluble salt thereof.

2. A process according to claim 1 wherein said stabilizer is hexamethylene diamine tetra(methylene phosphonic acid) or a water soluble salt thereof.

3. A process according to claim 1 wherein said stabilizer is ethylene diamine tetra(methylene phosphonic acid) or a water soluble salt thereof.

4. In compositions containing at least 1 phosphate salt of Group II metals and containing a stabilizer to inhibit the hydrolysis of said phosphate salt, the improvement which comprises that at least 30% of said stabilizers are selected from polyamide polyphosphonic acids of the formula:

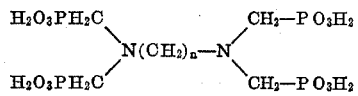

wherein n is a number of from 1 to 10 or a water soluble salt thereof; provided that said composition contains from about 0.1 to 5% by weight, based on the phosphate salt, of the polyamide polyphosphonic acid or water soluble salt thereof.

5. A composition according to claim 4 wherein said stabilizer is hexamethylene diamine tetra(methylene phosphonic acid) or a water soluble salt thereof.

6. A composition according to claim 4 wherein said stabilizer is ethylene diamine tetra(methylene phosphonic acid) or a water soluble salt thereof.

References Cited

UNITED STATES PATENTS

| | | | |
|---|---|---|---|
| 3,294,486 | 12/1966 | Cremer et al. | 423—309 |
| 3,574,534 | 4/1971 | Shaver et al. | 423—314 |
| 3,446,581 | 5/1969 | Smith et al. | 423—314 |
| 3,446,582 | 5/1969 | Smith et al. | 423—314 |

FOREIGN PATENTS

| | | | |
|---|---|---|---|
| 1,103,311 | 3/1961 | Germany | 23—107 |

OSCAR R. VERTIZ, Primary Examiner

G. A. HELLER, Assistant Examiner

U.S. Cl. X.R.

423—268, 308; 424—57